United States Patent
Lorin

(10) Patent No.: US 7,542,562 B1
(45) Date of Patent: Jun. 2, 2009

(54) METHOD FOR AUTOMATICALLY ADAPTING LEVELS OF SIGNALS EXCHANGED IN A COMMUNICATION NETWORK

(75) Inventor: Christophe Lorin, Grenoble (FR)

(73) Assignee: Thomson Licensing, Boulogne Billancourt (FR)

( * ) Notice: Subject to any disclaimer, the term of this patent is extended or adjusted under 35 U.S.C. 154(b) by 0 days.

(21) Appl. No.: 09/367,623

(22) PCT Filed: Feb. 16, 1998

(86) PCT No.: PCT/FR98/00295

§ 371 (c)(1),
(2), (4) Date: Nov. 23, 1999

(87) PCT Pub. No.: WO98/36549

PCT Pub. Date: Aug. 20, 1998

(30) Foreign Application Priority Data

Feb. 17, 1997 (FR) .................................. 97 01827

(51) Int. Cl.
*H04M 1/00* (2006.01)
*H04M 9/00* (2006.01)
(52) U.S. Cl. ...................................... 379/394; 379/402
(58) Field of Classification Search ............ 379/406.01, 379/406.04, 406.05, 406.06, 406.07, 406.16, 379/394, 398, 402, 403, 404
See application file for complete search history.

(56) References Cited

U.S. PATENT DOCUMENTS

| 3,781,481 | A | | 12/1973 | Shaffer et al. |
| 4,277,655 | A | | 7/1981 | Surprenant |
| 4,984,265 | A | * | 1/1991 | Connan et al. ......... 379/406.07 |
| 5,287,406 | A | * | 2/1994 | Kakuishi .................... 379/404 |
| 5,422,950 | A | | 6/1995 | Miller et al. |

FOREIGN PATENT DOCUMENTS

| GB | 2289188 | 11/1995 |
| JP | 05-047099 | 2/1993 |
| JP | 08-335976 | 12/1996 |

OTHER PUBLICATIONS

Patent Abstracts of Japan, vol. 012, No. 452 (E-687) Nov. 28, 1988 JP 63 178692A (Matsushita Electric Ind Co Ltd) Jul. 22, 1988.

* cited by examiner

*Primary Examiner*—Alexander Jamal
(74) *Attorney, Agent, or Firm*—Robert D. Shedd; Robert B. Levy; Jeffrey D. Hale

(57) ABSTRACT

The invention concerns a method and a device for automatically adapting the levels of signals exchanged in a telephone network, between a first set and a second set. The method is characterized in that it consists in the following steps: digitizing the signal coming from the transmission line and received by the first set; on the basis of the digital data translating the signals exchanged with the transmission line; estimating the transfer function equal to the ratio of the signal received by the first set over the signal transmitted by the first set; respectively multiplying each of the exchanged signals by an appropriate gain determined on the basis of the estimated value of said transfer function. The invention is particularly applicable to telephones, videophones, fax machines or computers connected to a communication network.

10 Claims, 2 Drawing Sheets

METHOD FOR AUTOMATICALLY ADAPTING LEVELS OF SIGNALS EXCHANGED IN A COMMUNICATION NETWORK

FIELD OF INVENTION

The present invention relates to a method for automatically matching the levels of the signals exchanged between apparatuses such as telephones, videophones (system for transmitting voice and video via the telephone network), faxes or computers which are connected to a communication network. The invention also relates to an automatic matching device.

BACKGROUND

The invention relates in particular to a method for automatically matching the levels of the signals exchanged in a telephone network.

SUMMARY

FIG. 1 schematically represents a subscriber loop 2 in a known architecture of a telephone network, connecting a user to a telephone exchange 4. The user transmits a signal IN1 and receives a signal OUT2 through a transmission line 6 which is represented by its impedance $Z_L$. This impedance has a detrimental effect on the signals exchanged between the user and the station.

One solution for correcting the distortions introduced by the analogue transmission line consists in measuring a DC voltage $V_{dc}$ across the terminals of a load 7 which is connected to the line through an inductor L1, given that the capacitors C1, C2 act as filters for low-frequency signals while the inductors L1, L2 filter the high-frequency signals. This voltage $V_{dc}$ is then delivered to a calculation module 8 which, on the basis of the result of this measurement, determines a value for $Z_L$. The calculation module also determines a gain G1, chosen so that the gain of IN1 at the point VL2 does not depend on $Z_L$, a gain G2, chosen so that the gain of IN2 in the signal OUT2 does not depend on $Z_L$ either, and a gain G3 which is chosen so as to suppress the sent signal IN2 from the received signal OUT2 and acts as an echo canceller (G3 is not shown in FIG. 1).

It can be determined that:

$$OUT2 = \frac{IN1}{2} * \left[\frac{Z_L}{Z_L + 2R_1}\right] + IN2 * \left[\frac{R_1}{Z_L + 2R_1}\right]$$

In this case, setting:

$$G1 = G2 = \frac{Z_L}{2R_1} + 1$$

and $$G3 = 2 * \frac{Z_L + R_1}{Z_L + 2R_1}$$

the following are obtained: OUT1=0.5*IN1 and OUT2=0.5*IN2

This solution is not suitable for compensating the signals exchanged by digital apparatuses, which need to be isolated from the subscriber loop and which do not therefore have access to the line impedance $Z_L$ via a direct voltage/current measurement.

Document U.S. Pat. No. 5,422,950 (Miller et al.) relates to the automatic compensation for attenuations in a telephone system. The estimate of the impedance of the line is made by measuring the voltage on the lines 28, 30 for a particular current using a simple resistance-measuring circuit 42. The subject matter of document U.S. Pat. No. 5,422,950 does not solve the problem mentioned above.

The object of the invention is to reduce the effect of the line impedance, and to do so even though the direct measurement described above is impossible.

This object is achieved by a method for automatically matching the levels of the signals exchanged between a first apparatus and a second apparatus which communicates with the said first apparatus via a transmission line, characterized in that it comprises the following steps:
the signal which comes from the transmission line and is received by the first apparatus (2) is digitized,
on the basis of the digital data representing the signals exchanged with the transmission line, an estimate is made of the transfer function equal to the ratio of the signal received by the first apparatus to the signal (IN1) transmitted by the first apparatus,
each of the exchanged signals (IN1, OUT2) is respectively multiplied by a suitable gain (G1, G2) determined on the basis of the estimated value of the said transfer function (K).

With the method according to the invention, it is no longer necessary to measure a DC voltage in order to determine the gains needed for the compensation, since the solution employed is essentially digital, that is to say software-based, and can therefore be employed for compensating the level of the signals exchanged in applications using digital apparatuses which are isolated from the subscriber loop, such as videophones, faxes or computers. The method allows, dynamically, operation in full duplex mode which is independent of temperature variations so long as at least one signal transmission out from the apparatus has been made in order to ascertain the initial characteristics of the line.

It may be advantageous for the numerical estimate making it possible to evaluate the transfer function (K) to be made using a software calculation method.

According to one embodiment, this calculation method implements an identification algorithm.

Preferably, the identification algorithm is of the LMS (Least Mean Square), RLS (Recursive Least Square) or Kalman type.

The invention also relates to a device for automatically matching the levels of signals exchanged between a first apparatus (3) and a second apparatus communicating via a transmission line, characterized in that it has:
an analogue/digital converter capable of digitizing a signal entering the first apparatus,
a digital/analogue converter capable of converting a signal transmitted by the first apparatus,
a calculation block intended to estimate the ratio of the incoming signal to the signal transmitted by the first apparatus, and to determine the gains needed for matching the levels of the signals transmitted and received by the first apparatus, the said gains being dependent on the said ratio.

According to one embodiment, the numerical calculation block has a unit for identifying the transfer function interacting with a calculation module which is intended to supply a first amplification means with the first gain for matching the level of the signal transmitted by a user, and to supply a second amplification means with the second gain for matching the level of the signal received by the user.

Advantageously, the calculation block is a DSP (Digital Signal Processing) circuit implementing an identification algorithm.

Other characteristics and advantages of the invention will become apparent from the following description, made by way of nonlimiting example and with reference to the appended figures, in which

DETAILED DESCRIPTION OF THE PREFERRED EMBODIMENTS

Figure 2:
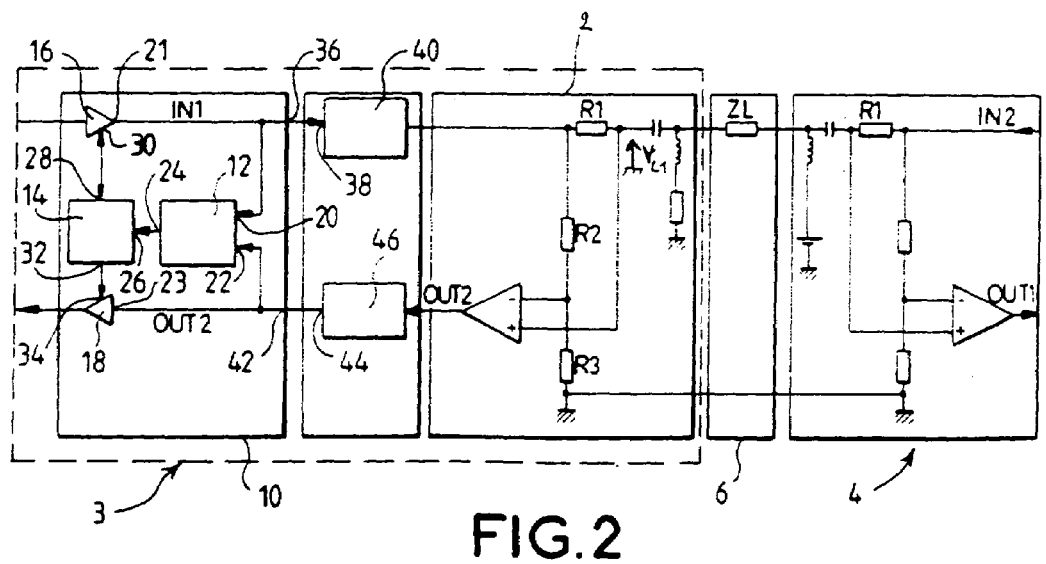

FIG. 2 schematically illustrates a link between a apparatus 3 of a user and a telephone exchange 4 via a transmission line 6 which is represented by its impedance $Z_L$. The user transmits a signal IN1 and receives a signal OUT2, while the station 4 transmits a signal IN2 and receives a signal OUT1.

In order to avoid the attenuation due to the impedance $Z_L$ of the line 6 which the signals IN1 and OUT2 suffer, and in order to keep the transfer functions for the signal IN1, at the point VL2, and for the signal OUT2 independent of the line impedance, the method according to the invention has a step of digitizing the signal entering the said apparatus, a step of estimating the transfer function K as a function of the exchanged signals OUT2 and IN1, then a step of multiplying each signal by a suitable gain determined on the basis of the value of the transfer function K determined beforehand.

When the signal IN1 is transmitted, the signal OUT2 detected at the output of the subscriber loop is applied to an analogue/digital converter 44 which digitizes the said signal OUT2.

The estimate of the transfer function K is made numerically by an identification algorithm based, for example, on the method of least squares, the RLS (Recursive Least Square) algorithm or alternatively on the Kalman algorithm. The algorithm has the function of calculating the characteristic parameters of the transfer function K, which may in particular be a matrix $(h_i)_{1 \leq i \leq n}$ or a polynomial fraction in $(Z_L^{-i})_{1 \leq i \leq n}$.

In the present embodiment, the calculation consists in firstly determining the ratio:

$$\frac{OUT2}{IN1} = K(Z_L) + \varepsilon$$

where $$K(Z_L) = \frac{Z_L}{2 \cdot (Z_L + 2 \cdot R_1)}$$

This being true in the present embodiment with an impedance $Z_L$ which is assumed to be constant. It is clear that the source impedance is equal to the input impedance of the line for a short line $Z_L=0$ and the input impedance of the line is dependent on the characteristic impedance $Z_C$ and on the load impedance $Z_R$; in the present case, $Z_R$ is equal to the source impedance R1. For the sake of simplicity, the condition $Z_L=Z_C$ is set.

A step subsequent to this calculation consists in determining:

for the transmitter signal, a first gain $$G1(Z_L) = \frac{Z_L}{2R_1} + 1 = \frac{1}{1 - 2 \cdot K(Z_L)}$$

and for the received signal, a second gain $$G2(Z_L) = \frac{1}{1 - 2 \cdot K(Z_L)}.$$

It can be seen that for these values of gains, the voltage OUT2 at the ends of the transmission line is equal to half the voltage VL2 (apart from echoes of IN1).

The device in FIG. 2 has a numerical calculation block 10 intended to estimate the impedance $Z_L$ of the transmission line and to determine the gains needed for compensating the exchanged signals. This numerical calculation block 10 has a unit 12 for identifying the transfer function K interacting with a calculation module 14 which is intended to supply a first amplification means 16 with the first gain G1 for compensating for the attenuation of the signals transmitted by the user, and to supply a second amplification means 18 with a second gain G2 for compensating for the attenuation of the signal received by the user.

Preferably, the numerical calculation block 10 is a DSP (Digital Signal Processing) circuit employing one of the identification algorithms mentioned above. Another type of circuit may, of course, be used.

As can be seen in FIG. 2, a first input 20 of the identification unit 12 is connected to the output 21 of the first amplification means 16, while a second input 22 of the said identification unit 12 is connected to a first input 23 of the second amplification means 18. The output 24 of the identification unit 12 is connected to the input 26 of the calculation module 14. A first output 28 of the calculation module 14 is connected to a first input 30 of the first amplification means 16, while a second output 32 of the calculation module 14 is connected to a second input 34 of the second amplification means 16. The output 36 of the numerical calculation block 10 is connected to an input 38 of a digital/analogue converter 40, while the input 42 of the said numerical calculation block 10 is connected to the output 44 of an analogue/digital converter 46.

During operation, the identification unit 12 supplies the calculation module 14 with an estimated value of the transfer function K, calculated on the basis of the values of the signals transmitted and of the signals received by the user. These signals are applied respectively to the first input 20 and to the second input 22 of the identification unit 12.

The calculation module 14 supplies the first amplification means 16 with the first gain G1 in order to compensate for the attenuation of the signals transmitted by the user, and supplies the second amplification means 18 with the second gain G2 in order to compensate for the attenuation of the signals received by the user.

Figure 1:
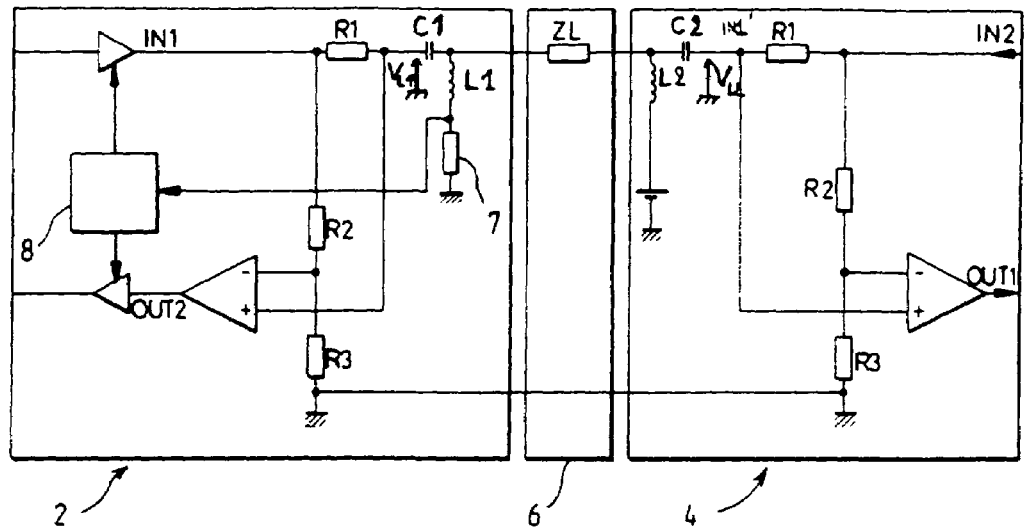
FIG. 1, already described, schematically represents a subscriber loop in a telephone network according to a prior art architecture, FIG. 2 schematically represents a subscriber loop in a telephone network having a device for automatically matching the levels of the signals exchanged according to the invention, and FIG. 3 schematically represents a similar subscriber loop to FIG. 2, implementing an echo canceller.

The method and the device of the invention thus make it possible to perform automatic matching of the levels of the signals exchanged through a transmission line. Furthermore, this system is not sensitive to temperature drifts which can affect the voltage measurement advocated in the prior art, such as that across the terminals of the load 7 in FIG. 1. The method is thus independent of the variations in the power source X of the telephone network.

Knowledge of the transfer function $K(Z_L)$ can also be used to detect the presence of a parallel connection of the device of the invention in the transmission line. The said detection method includes a step of observing the sign of the gain of the identified transfer function K. When the sign is negative, then it is deduced that a second set is connected in parallel with the transmission line. This information can be used, for example, without implying any limitation, for security reasons in the case of using a modem and a telephone. If detection is made by the modem then the latter can hang up to free the line.

Figure 3:
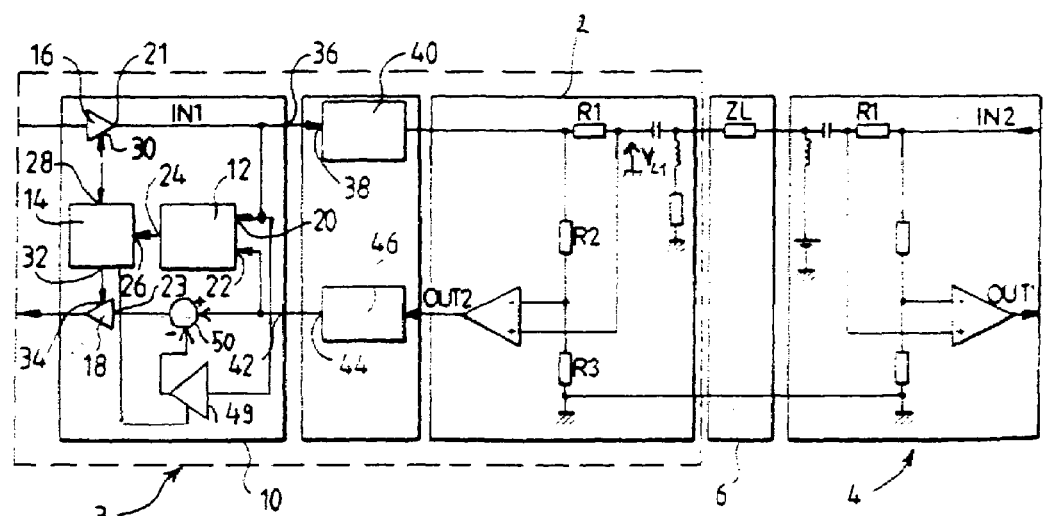

FIG. 3 is similar to FIG. 2, with the same elements having the same references. However, echo-cancelling means are furthermore introduced into the device. In practice, this is equivalent to making OUT2 independent of IN1. To that end, a third gain, G3, is introduced which is applied to IN1 by means of an amplifier 49. The whole is subtracted from OUT2 by a subtractor 50, before amplification by G2. It can be shown that, in order to cancel the echo, it is necessary that $G3=K(Z_L)$.

The invention claimed is:

1. Method for automatically matching the levels of the signals exchanged between a first apparatus and a second apparatus which communicates with the said first apparatus via a transmission line, characterized in that it comprises the following steps:

the digital which comes from the transmission line and is received by the first apparatus is digitized, on the basis of the digital data representing the signals exchanged with the transmission line, an estimate is made of the transfer function equal to the ratio of the signal received by the first apparatus to the signal transmitted by the first apparatus, the estimate of the transfer function is defined in the following way:

$$\frac{OUT2}{IN1} = K(Z_L) + \varepsilon$$

where $$K(Z_L) = \frac{Z_L}{2 \cdot (Z_L + 2 \cdot R_1)}$$

and $Z_L$ represents the impedance of the transmission line, while R1 represents the source impedance of the transmission line,
the following are calculated:
for the transmitter signal, the first gain G1

$$G1(Z_L) = \frac{1}{1 - 2 \cdot K(Z_L)}$$

and for the received signal, the second gain G2

$$G2(Z_L) = \frac{1}{1 - 2 \cdot K(Z_L)}.$$

each of the exchanged signals is respectively multiplied by a suitable gain determined on the basis of the estimated value of the said transfer function.

2. Method according to claim 1, characterized in that the gain of the signal received by the first apparatus is chosen so that the component of the signal transmitted by the second apparatus in the signal received by the first apparatus is independent of the impedance of the transmission line.

3. Method according to claim 1, characterized in that the gain of the signal transmitted by the first apparatus is chosen so that the component of this signal in the signal received by the second apparatus is independent of the impedance of the transmission line.

4. Method according to claim 2, characterized in that the said calculation method implements an identification algorithm.

5. Method for automatically matching the levels of the signals exchanged between a first apparatus and a second apparatus that communicates with the first apparatus via a transmission line, comprising the steps:

receiving and digitizing by the first apparatus the signal which comes from the transmission line, estimating, on the basis of the digital data representing the signals exchanged with the transmission line, the transfer function (K) equal to the ratio of the signal received by the first apparatus to the signal transmitted by the first apparatus, the estimate of the transfer function (K) comprising $$\frac{OUT2}{IN1} = K(Z_L) + \varepsilon$$

where $$K(Z_L) = \frac{Z_L}{2 \cdot (Z_L + 2 \cdot R_1)}$$

and $Z_L$ represents the impedance of the transmission line, while R1 represents the source impedance of the transmission line, the following are calculated: for the transmitter signal, the first gain G1 comprises $$G1(Z_L) = \frac{1}{1 - 2 \cdot K(Z_L)}$$

and for the received signal, the second gain G2 comprises $$G2(Z_L) = \frac{1}{1 - 2 \cdot K(Z_L)},$$

and multiplying each of the exchanged signals, respectively, by a suitable gain determined on the basis of the estimating of a value of the transfer function (K).

6. Device for automatically matching the levels of signals exchanged between a first apparatus and a second apparatus communicating via a transmission line, characterized in that it has:

an analogue/digital converter capable of digitizing a signal entering the first apparatus, a digital/analogue converter capable of converting a signal transmitted by the first apparatus, a calculation block intended to estimate the ratio of the incoming signal to the signal transmitted by the first apparatus, and to determine the gains needed for matching the levels of the signals transmitted and received by the first apparatus, the gains being dependent a transfer function (K) equal to the ratio of the incoming signal received by the first apparatus to the signal transmitted by the first apparatus, the estimate of the transfer function (K) comprising $$\frac{OUT2}{IN1} = K(Z_L) + \varepsilon$$

where $$K(Z_L) = \frac{Z_L}{2 \cdot (Z_L + 2 \cdot R_1)}$$

and $Z_L$ represents the impedance of the transmission line, while R1 represents the source impedance of the transmission line, the following are calculated: for the signal transmitted, the first gain G1 comprises $$G1(Z_L) = \frac{1}{1 - 2 \cdot K(Z_L)}$$

and for the incoming signal received, the second gain G2 comprises $$G2(Z_L) = \frac{1}{1 - 2 \cdot K(Z_L)}.$$

7. Device according to claim 6, characterized in that the block has a unit for identifying the transfer function interacting with a calculation module which is intended to supply a first amplification means with the first gain for matching the level of the signal transmitted by the first apparatus, and to supply a second amplification means with the second gain (G2) for matching the level of the signal received by the first apparatus.

8. Device according to claim 6, characterized in that the calculation block has a DSP circuit implementing an identification algorithm.

9. Device according to claim 8, characterized in that the identification algorithm is of the LMS, RLS or Kalman type.

10. Communication apparatus, characterized in that it has a device according to claim 6.

\* \* \* \* \*